May 23, 1944.  A. BRUNNER  2,349,610
HYDRAULICALLY OPERATED OSCILLATION DAMPER
Filed Jan. 20, 1942   5 Sheets-Sheet 1
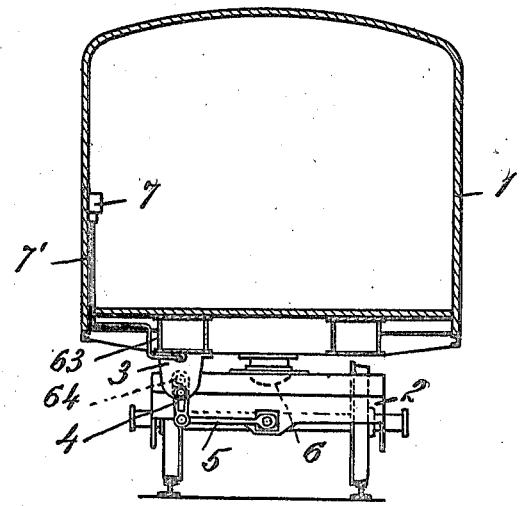
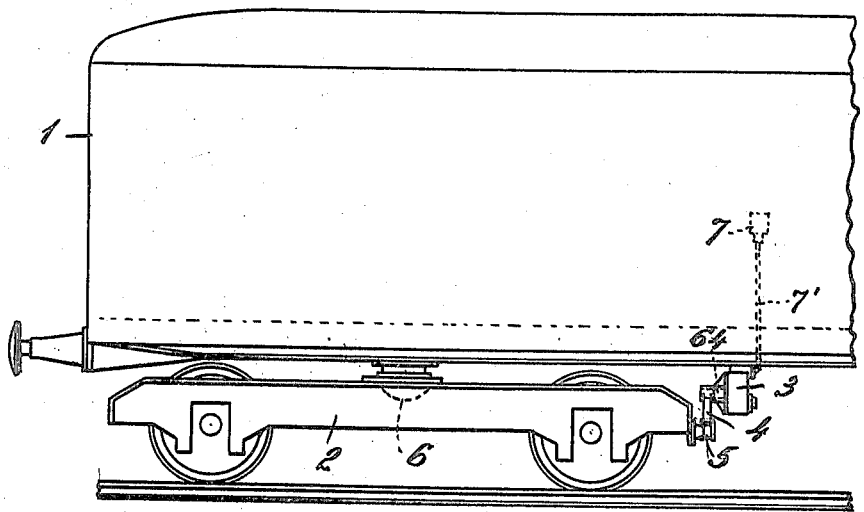
INVENTOR
Adolf Brunner
BY
ATTORNEYS

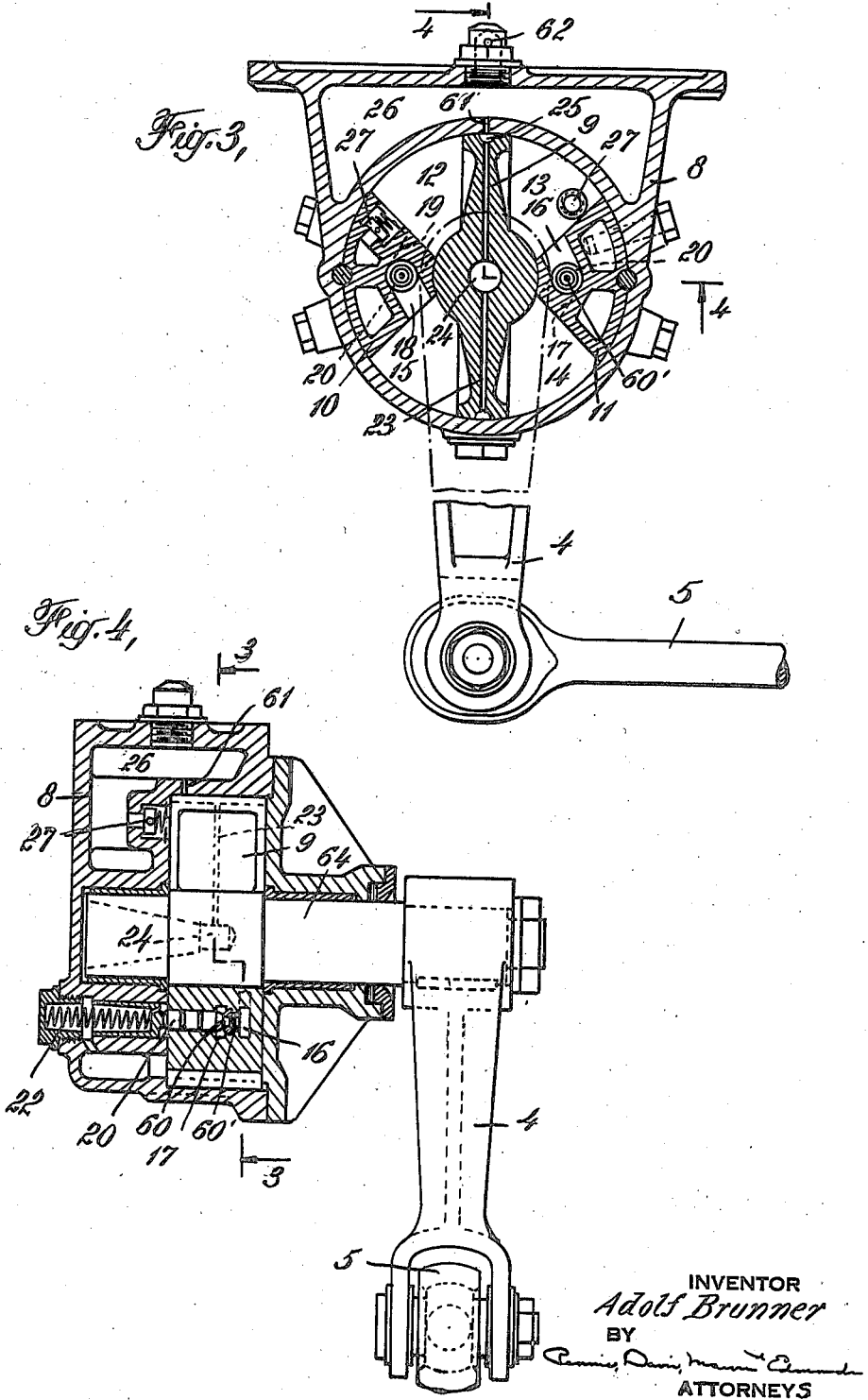

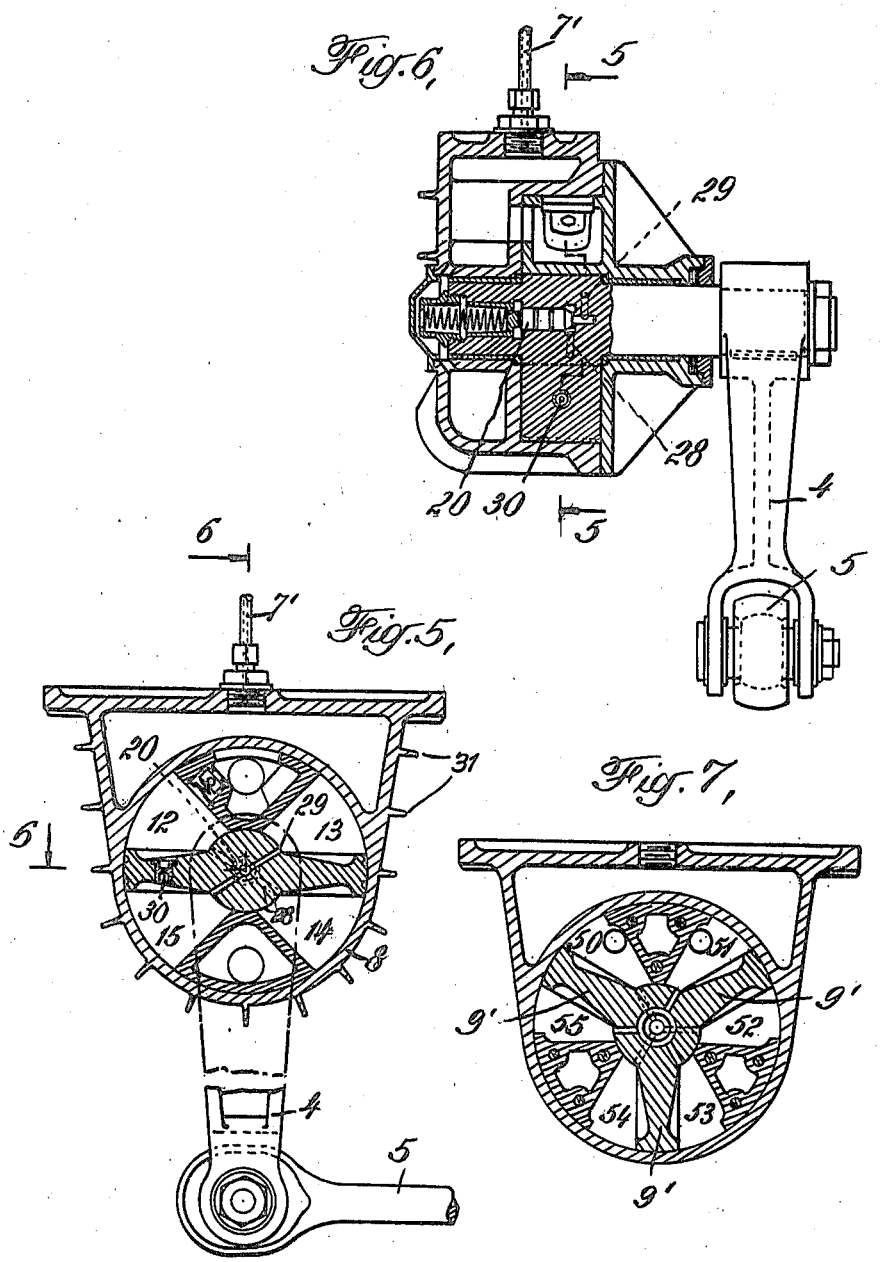

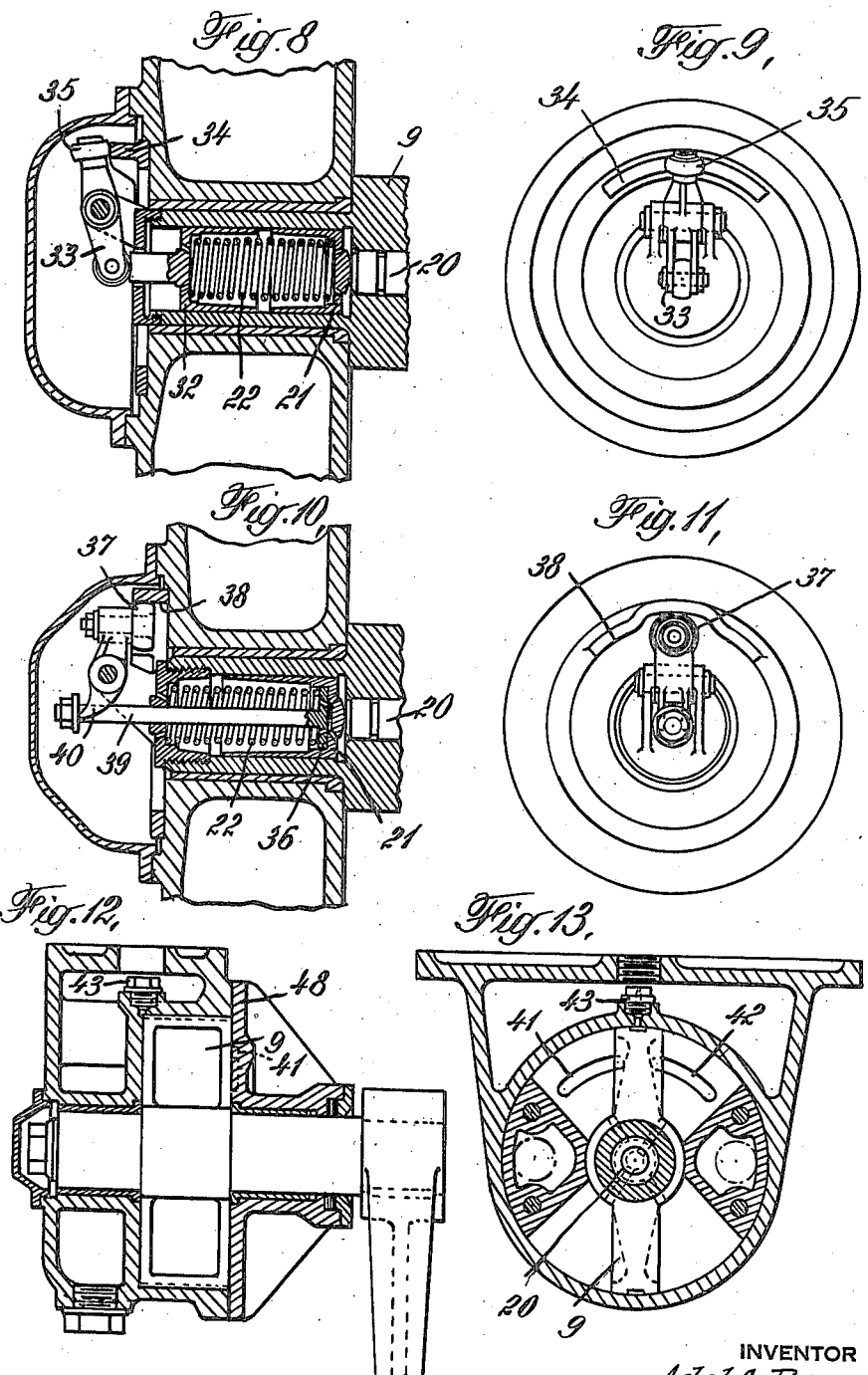

May 23, 1944.　　　A. BRUNNER　　　2,349,610
HYDRAULICALLY OPERATED OSCILLATION DAMPER
Filed Jan. 20, 1942　　　5 Sheets-Sheet 5
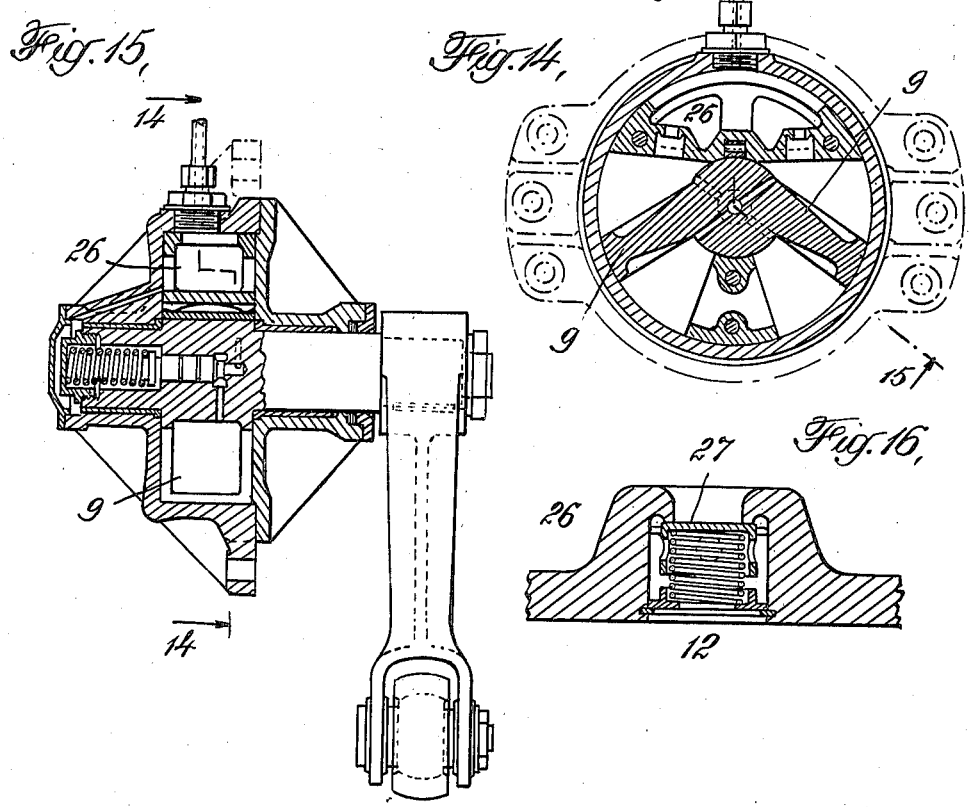
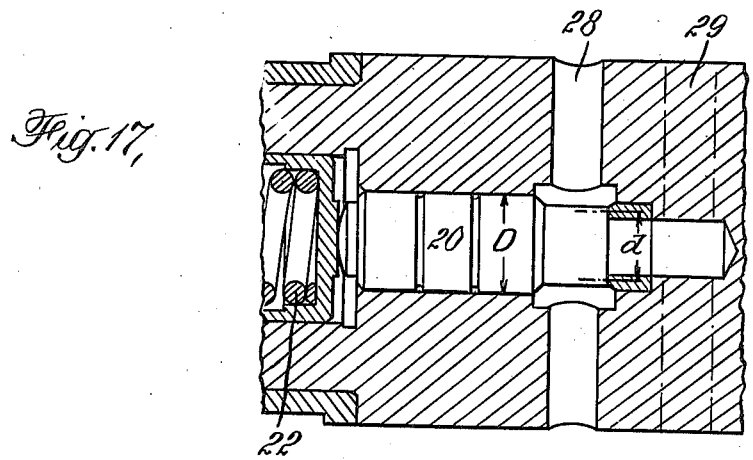
INVENTOR
*Adolf Brunner*
BY
ATTORNEYS Patented May 23, 1944

2,349,610

UNITED STATES PATENT OFFICE 2,349,610

HYDRAULICALLY OPERATED OSCILLATION DAMPER

Adolf Brunner, Winterthur, Switzerland, assignor to Sulzer Frères, Société Anonyme, Winterthur, Switzerland Application January 20, 1942, Serial No. 427,412
In Switzerland June 19, 1941

6 Claims. (Cl. 188—89)

The invention relates to an hydraulically operated oscillation damper for damping the relative movements, whether of rotation or of translation, of one machine element with respect to another, the working piston of the damping device being constructed as a double-acting multi-blade oscillatable piston. The device is intended especially for rail vehicles and consists in that, from a particular displacement of the oscillatable piston onwards, the torque taken by the oscillatable piston decreases.

The oscillation damper may consist of a double-acting member which connects the momentary pressure and suction spaces as soon as the pressure caused by the oscillatable piston, when the part to be damped moves, exceeds a certain determined figure. After the motion of the oscillatable piston has exceeded a certain amplitude, the suction and pressure spaces may be directly connected to each other by means of a suitable device. The connection established by the device may contain a throttle member. Then the suction and pressure spaces may be permanently connected to each other through a throttle which is adjustable or not. In the case of existing throttle methods between the suction and pressure spaces of the damper, the connecting duct established by the member when a particular pressure is exceeded, will connect the suction and pressure spaces practically without throttling.

By means of cams and linkage the pressure at which an overflow occurs may be reduced as the amplitude of the movement increases. By making use of a curved path and a linkage guided thereby, the spring of the member can be lifted from the valve when the part to be damped has moved through a certain amplitude. By the oscillatable piston, grooves in the casing or cover can be uncovered. In the packing face of the oscillatable piston, a groove for venting the cylinder can be arranged at the part which is uppermost during service in the middle position. Ribs can be fitted on the casing to lead away the heat produced within the oscillation damper. In certain cases a cooler may also be arranged for carrying away the heat generated; the space containing a store of spare liquid is preferably provided within the cylinder space.

Hydraulically operated oscillation dampers for such purposes are already known. In one of the known types two pistons are provided, of which one comes into action when a deflection occurs to one side, when the other piston comes into action in the case of a deflection to the other side. The liquid is then pumped over from one cylinder space into the other, whereby it passes through a throttle, so that the necessary force for damping the relative motion of two machine elements is exerted on the linkage connected to the two pistons. This execution has the drawback that the pistons are badly utilised, so that the whole device is heavy and expensive.

In the execution according to the invention these drawbacks are provided by adopting a multi-blade oscillatable piston, with the liquid acting on both sides of it. This has also the advantage that the torque acting on several blades allows the stresses on the bearings to be reduced practically or completely to naught.

Figs. 1 and 2 show an example for the arrangement of such a damper in rail vehicles for damping the horizontal swaying motion of the bogie.

Figs. 3 and 4 give two cross-sections through a damper.

Figs. 5 and 6 show a special construction of the piston with a throttle opening for keeping the spaces on both sides of the piston in constant connection and with a safety valve arranged in the piston.

Fig. 7 shows a similar construction, but with a three-blade oscillatable piston.

Figs. 8 to 13 show special executions in which the damping effect, when the angular deflection of the oscillatable piston exceeds a certain value, is reduced or made quite ineffective, this being done in Figs. 8 and 9 by relieving the spring pressure of the safety valve by a double lever controlled by a cam, and in Figs. 10 and 11 by relieving the spring pressure of the safety valve by double lever controlled by a curve; whilst in Figs. 12 and 13 the pressure equalisation on the two sides of the oscillatable piston is effected through grooves which can be uncovered when a certain deflection is exceeded.

Figs. 14 and 15 shows a damper with a storage space for liquid within the cylinder.

Fig. 16 shows the details of a check valve, and

Fig. 17 a part of the safety valve.

In Figs. 1 and 2, 1 is the car body and 2 the bogie of a rail vehicle. The casing of the oscillation damper 3 is rigidly fixed to the car body, for instance to the sole bar 63. The lever 4 is connected to the shaft 64 of the oscillatable piston 9 (Figs. 3 and 4) of the oscillation damper. The rod 5 connects the lever 4 by means of ball joints to a fixed point on the bogie 2.

If the bogie turns in a horizontal plane round the centre pin 6, this movement is transmitted to the oscillation damper 3 in such a way that its oscillatable piston oscillates round its horizontal axis. The force exerted by the oscillation damper as described below has therefore a braking effect on the turning movement of the bogie. To make up any loss by leakage in the oscillation damper a filling tank 7 with pipe 7' may be provided in an easily accessible position, for instance in the car body.

In Figs. 3 and 4, 8 is the casing and 9 the oscillatable piston of the oscillation damper 3. By means of the parts 10 and 11 and the piston 9, the cylinder space of the oscillation damper is divided into four working spaces 12, 13, 14, 15. When the piston 9 oscillates, two spaces situated opposite to each other 12, 14 or 13, 15 are put under pressure. In the other spaces there is at the same time a depression. While the piston 9 is oscillating, liquid flows through the passages 16, 17, 18, 19 and the valves 20 from the pressure spaces into the suction spaces. As long as the piston 9 is at rest, the valves 20 are kept closed by the springs 22 acting through the pistons 21.

If the bogie 2 of the vehicle turns clockwise looked on from above, the oscillatable piston 9 will also be moved clockwise by the motion of the rod 5. The spaces 13 and 15 thereby come under pressure, which is also the case in the passages 16 and 18. From the passage 16 a pressure is exerted on the end face 60 of the valve 20. As soon as this pressure is great enough, the valve (in Fig. 4) moves to the left and connects the passages 16 and 17 together. The valve 20, however, remains open only as long as an excess pressure prevails in the passage 16. When passing from passage 16 to passage 17, or from 18 to 19, a throttling effect is produced, which more or less increases the pressure in the pressure space 13 or 15 according to the speed of oscillation of the piston 9. In this way a damping effect on the movement of the bogie is produced. This damping effect can be regulated to suit requirements by adjusting the spring 22 or by regulating an adjustable throttling in two of the passages 16 to 19.

A radial bore 23 and an axial bore 24 in the piston 9 serve, together with a groove 25, to remove air from the working spaces. The air will always collect at the highest part of the space. As soon as the space in question is put under pressure, the air goes through the packing surface to the groove 25 and from there through a bore 61 into the space 26 from where it can escape to atmosphere through the filling opening (venting opening 62). This filling opening may be quite open, so that the space 26 serves only as a pressure-equalising space. However, as shown in Figs. 5 and 6, the filling opening can also be connected to the pipe 7' of Fig. 1. Check valves 27 are provided to allow any liquid losses in the working spaces 12 to 15 to be constantly made up from the liquid in the space then serving as storage room.

In Figs. 5 and 6, instead of the two valves 20 of Fig. 3, only one single valve 20 of similar construction is provided within the piston 9. The spaces which are under the same pressure, 12, 14 or 13 and 15, are connected by means of the passages 28 and 29. The suction and pressure spaces are constantly in connection through the throttle opening 30. When the piston 9 makes small oscillating movements, the pressure does not become so high as to cause the valve 20 to open. On roads with numerous curves of small radius it may be advantageous to design the valve 20 merely as a safety valve. As soon as the oscillations of the bogie and consequently also the pressure in the working spaces exceed a certain value, the valve 20 opens and connects the suction and pressure spaces direct, so that no further increase in pressure occurs and the resistance to turning of the piston will not be further increased as long as the vehicle is only running round curves.

The energy destroyed by the oscillation damper is practically all used do heat the liquid. If it is necessary to consider cases where the oscillation damper will come into operation very often, it will be found advantaageous to provide its casing with cooling ribs 31, and in very extreme cases it will even be preferable to lead the damping fluid to a special cooler, not shown in the drawings.

If the oscillation damper when of small dimensions and recording small deviations has to exert a great force, then it is preferable to provide the oscillatable piston with more than two blades. Such an execution 9' with three blades is shown in Fig. 7; according to this the cylinder is divided into six working spaces. The spaces 51, 53, 55 are, however, in connection with each other, but divided from the spaces 52, 54, 50.

In Figs. 8 and 9 a valve 20 of a type similar to those in Figs. 3 to 6 is illustrated. The spring 22, resting against the end of the piston 21 on the side opposite the face, is supported, however, not as in Figs. 3 to 6 on the casing of the oscillatable piston 9, but on a movable spring plate 32, the position of which is determined by the double lever 33 and the cam ring 34. The lever 33 moves round with the oscillatable piston 9 whilst the ring 34 remains stationary. The ring 34 is of such a form, that the roller 35 takes up the highest position shown in the drawings (compare Fig. 9) when the piston 9 is in its middle position. When the vehicle is running straight, the pressure at which the valve 20 opens, and consequently also the resistance to deflection of the bogie, is the maximum. With increasing deflection of the bogie, the roller 35 moves along the cam 34 so that, as the radius of the curve decreases, the resistance against the motion also decreases. With advantage the cam 34 is shaped in such a way that the valve 20 is entirely relieved when the bogie makes a certain deflection so that the resistance against turning of the bogie becomes again naught.

In Figs. 10 and 11 the spring 22 presses on the piston 21 and the valve 20 through an intermediate plate 36. In the case of small deflections of the bogie, the valve 20 is affected, on the one hand by the pressure of the spring 22 and on the other hand by the liquid pressure of the respective working spaces. But when the deflections are great, the roller 37 is pressed downwards from the curve path 38 in such a way that the lever fork 40 presses the rod 39 with the intermediate plate 36 to the left and thus partially or completely relieves the valve 20. In this way the two working spaces are connected to each other and the movement can take place freely without resistance.

Figs. 12 and 13 show an execution which is preferable when running on roads with numerous curves. The valve 20, which is common to all the working spaces, is within the oscillatable piston 9. In the cover or casing 48 of the oscillation damper, grooves 41, 42 are provided which establish a direct connection between the suction and pressure spaces as soon as the oscillation of the bogie or of the oscillatable piston 9 exceeds a certain value. In the case of railway curves under a certain radius, the damping effect with this execution is practically nil, which is very favourable. A venting means 43 may be provided through the casing instead of through the piston 9 as in Figs. 3 and 4.

In Figs. 14 and 15 the liquid storage space 26 is arranged within the cylinder space, thus reducing the space required for the installation and also its weight. The oscillatable piston 9 thus assumes a non-symmetrical form.

The function of the check valve as in Fig. 16 has been explained in connection with Figs. 3 and 4. The valve is a safety valve of known type, which allows liquid to flow from the storage room 26 when depression exists in the cylinder space 12.

The operation of the valve 20 as shown in Fig. 17 is as follows: With an excess pressure $p$ in the spaces 12 and 14 of Fig. 5 and consequently in the passage 28, the adjusting force on the valve corresponds to $$\frac{\pi}{4}(D^2-d^2)p$$

and with a depression in passage 29 the force becomes $$\frac{\pi}{4}d^2p$$

By suitably choosing the diameters $d$ and $D$ it is at once possible to obtain the same adjusting force with the same pressure in the passages 28 or 29. In order to damp certain oscillations effectively with small forces, it may also, however, prove advantageous to fix the diameters $d$ and $D$ in such a way that the adjusting forces are not equally great in the case of equal pressures.

The foregoing description of the operation of the oscillation dampers of the invention has been based largely on a clockwise rotation of the oscillatable valve 9. That the damper operates similarly when the force turns the oscillatable valve counterclockwise will be apparent with reference to the operation of Figs. 5 and 17.

When the oscillatable piston 9 rotates clockwise, the spaces 12 and 14 are delivery spaces and the spaces 13 and 15 suction spaces. Consequently the valve 20 is loaded by the pressure in the passage 28 on the annular surface of the valve 20 with the external diameter D and the internal diameter somewhat greater than $d$ (Fig. 17). When the valve 20 opens by being displaced to the left under a pressure determined by the spring 22, the damping liquid flows from the passage 28 through the valve seat into the passage 29 and from there into the spaces 13 and 15. When the double-winged piston 9 turns in a counterclockwise direction, the spaces 13 and 15 are delivery spaces and the spaces 12 and 14 suction spaces. The liquid in the spaces 13 and 15 and consequently in the passage 29 is set under pressure and loads the valve 20 on the righthand end-surface with a somewhat smaller diameter than $d$ (Fig. 17). When the pressure is sufficient, the valve 20 is displaced to the left (Fig. 17) just as in the foregoing case, and the connection opens from the passage 29 to the passage 28 and to the two suction spaces 12 and 14. It is a simple matter to make the annular piston surface exactly as large as the righthand end-surface (Fig. 17), so that the valve opens at the same pressure when turned in one direction or in the other.

The described device can also be adopted with advantage for other plants, in particular for those in which it is necessary to damp or brake relative movements of translation or rotation between two parts.

I claim:

1. An hydraulic oscillation damper for damping relative movements of one element with respect to another which comprises a casing adapted to be connected to one element, an oscillatable piston in the casing, means connecting the piston with the other element, whereby the piston is oscillated with respect to the casing, at least two suction spaces and at least two pressure spaces in the casing containing liquid, the liquid in two pressure spaces being placed under high pressure and the liquid in two suction spaces being placed under low pressure when the piston oscillates in one direction, passage means for liquid connecting each of the pressure spaces with a suction space, spring-controlled valve means for permitting the flow of liquid through the passage means from a pressure space to a suction space, means for adjusting the spring to open the valve at various predetermined pressures, and means for varying the pressure on the spring of the valve as the piston oscillates.

2. An hydraulic oscillation damper for damping relative movements of one element with respect to another which comprises a casing adapted to be connected to one element, an oscillatable piston in the casing, means connecting the piston with the other element, whereby the piston is oscillated with respect to the casing, at least two suction spaces and at least two pressure spaces in the casing containing liquid, the liquid in two pressure spaces being placed under high pressure and the liquid in two suction spaces being placed under low pressure when the piston oscillates in one direction, passage means for liquid connecting each of the pressure spaces with a suction space, spring-controlled valve means for permitting the flow of liquid through the passage means from a pressure space to a suction space, and cam means in cooperative engagement with the piston and the spring-controlled valve means for decreasing the load on the valve as the oscillations of the piston increase.

3. An hydraulic oscillation damper for damping relative movements of one element with respect to another which comprises a casing adapted to be connected to one element, an oscillatable piston in the casing, means connecting the piston with the other element, whereby the piston is oscillated with respect to the casing, at least two suction spaces and at least two pressure spaces in the casing containing liquid, the liquid in two pressure spaces being placed under high pressure and the liquid in two suction spaces being placed under low pressure when the piston oscillates in one direction, passage means for liquid connecting each of the pressure spaces with a suction space, spring-controlled valve means for permitting the flow of liquid through the passage means from a pressure space to a suction space, a cam means operated by the piston, and a linkage connected to the spring and operated by the cam means, whereby the pressure on the spring may be varied under the action of the cam as the piston oscillates.

4. An hydraulic oscillation damper for damping relative movements of one element with respect to another which comprises a casing adapted to be connected to one element, an oscillatable piston in the casing, means connecting the piston with the other element, whereby the piston is oscillated with respect to the casing, at least two suction spaces and at least two pressure spaces in the casing containing liquid, the liquid in two pressure spaces being placed under high pressure and the liquid in two suction spaces being placed under low pressure when the piston oscillates in one direction from its central position, the pressure spaces and suction spaces changing to suction spaces and pressure spaces respectively when the piston oscillates in the other direction, means for changing the two pressure spaces and the two suction spaces to suction spaces and pressure spaces respectively when the piston oscillates in the opposite direction beyond its center position, said pressure spaces and suction spaces being under identical pressure conditions regardless of which side of center the piston occupies whereby the piston offers the same opposing action on both sides of its center position, passage means for liquid connecting each of the pressure spaces with a suction space, a controlled valve means controlling the passage of liquid from each of the pressure spaces to one of the suction spaces as the piston oscillates in both directions.

5. An hydraulic oscillation damper for damping relative movements of one element with respect to another which comprises a casing adapted to be connected to one element, an oscillatable piston in the casing, means connecting the piston with the other element, whereby the piston is oscillated with respect to the casing, at least two suction spaces and at least two pressure spaces in the casing containing liquid, the liquid in two pressure spaces being placed under high pressure and the liquid in two suction spaces being placed under low pressure when the piston oscillates in either direction, means for changing the two pressure spaces and the two suction spaces to suction spaces and pressure spaces respectively when the piston oscillates in the opposite direction beyond its center position, said pressure spaces and suction spaces being under identical pressure conditions regardless of which side of center the piston occupies whereby the piston offers the same opposing action on both sides of its center position, passage means for liquid connecting each of the pressure spaces with a suction space, a separate spring-controlled valve controlling the passage of liquid from each of the pressure spaces to one of the suction spaces, a storage space for liquid, a duct connecting one pressure space and one suction space with the storage space, and a check valve in the duct, whereby liquid from the storage space flows into the pressure and suction spaces to replenish liquid losses.

6. An hydraulic oscillation damper for damping relative movements of one element with respect to another which comprises a casing adapted to be connected to one element, an oscillatable piston in the casing, means connecting the piston with the other element, whereby the piston is oscillated with respect to the casing, at least two suction spaces and at least two pressure spaces in the casing containing liquid, the liquid in two pressure spaces being placed under high pressure and the liquid in two suction spaces being placed under low pressure when the piston oscillates in either direction, means for changing the two pressure spaces and the two suction spaces to suction spaces and pressure spaces respectively when the piston oscillates in the opposite direction beyond its center position, said pressure spaces and suction spaces being under identical pressure conditions regardless of which side of center the piston occupies whereby the piston offers the same opposing action on both sides of its center position, passage means for liquid connecting each of the pressure spaces with a suction space, adjustable means responsive to liquid pressure in the said passage means for controlling the flow of liquid through the passage means from the pressure spaces to the suction spaces as the piston oscillates in both directions from its central position.

ADOLF BRUNNER.